Dec. 18, 1934.  P. MATHER ET AL  1,984,686
TREATMENT OF HYDROCARBON OILS
Filed April 27, 1931
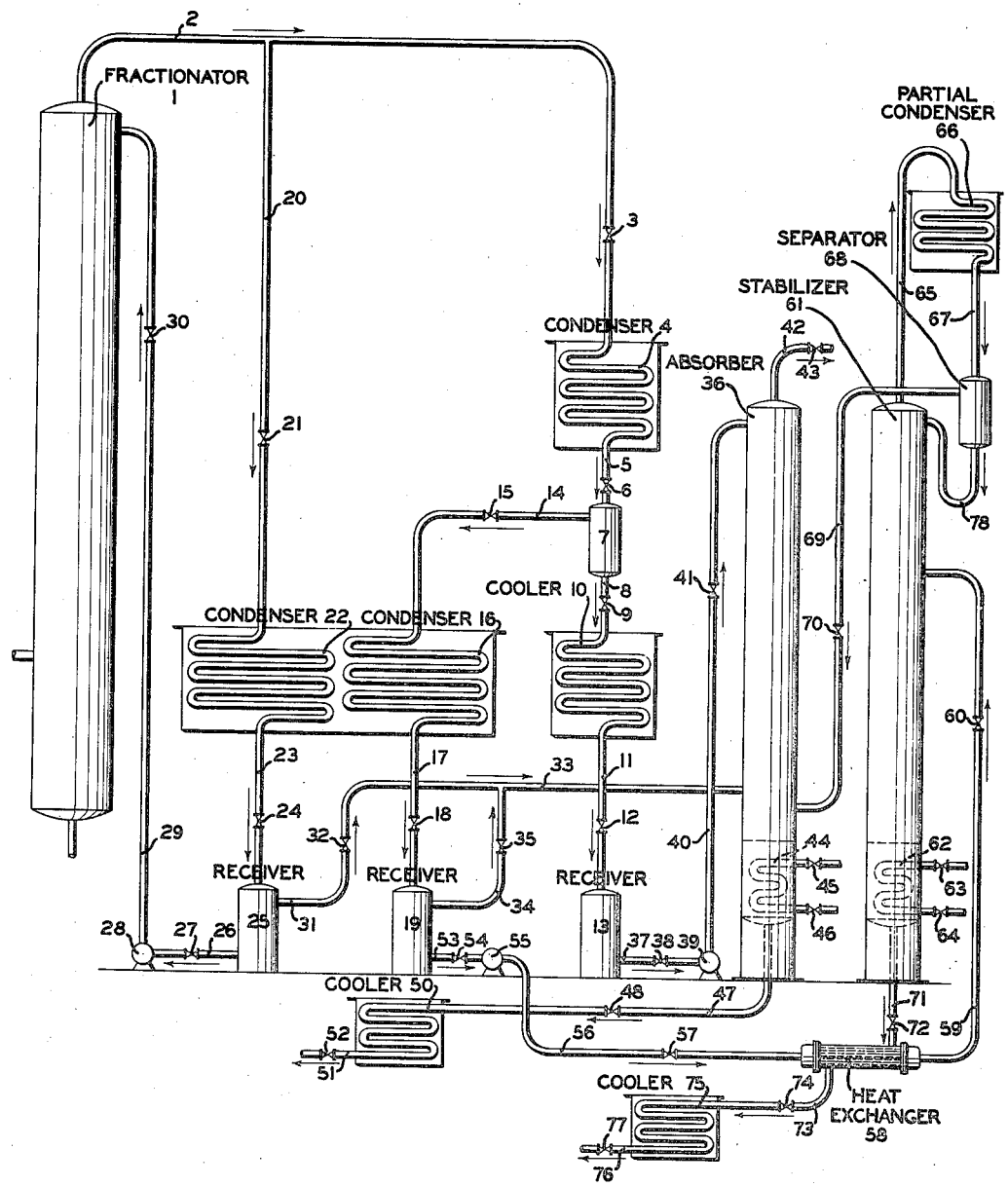
INVENTORS
PERCY MATHER
DONALD J. BERGMAN
BY Frank L. Belknap
ATTORNEY Patented Dec. 18, 1934

1,984,686

UNITED STATES PATENT OFFICE 1,984,686

TREATMENT OF HYDROCARBON OILS

Percy Mather and Donald J. Bergman, Chicago, Ill., assignors to Universal Oil Products Company, Chicago, Ill., a corporation of South Dakota Application April 27, 1931, Serial No. 533,055

10 Claims. (Cl. 196—11)

This invention relates to the treatment of hydrocarbon oils and particularly refers to an improved process and apparatus for the stabilization of hydrocarbon distillates and stripping of vapor-charged gases.

Our invention, which will be hereinafter more fully described, is particularly directed to the stabilization of the relatively light conversion products resulting from the cracking of heavier hydrocarbon oils, although the principles of the invention are adaptable to the stabilization of any fluid which it is desirable to substantially free of components exerting a relatively high vapor pressure and/or of entrained gas as well as any vaporous and/or gaseous material which it is desired to substantially free of condensable components.

A specific embodiment of the invention may comprise subjecting fractionated hydrocarbon vapors from a cracking system to partial condensation, separating the condensed and uncondensed components of the vapors, cooling the condensate and collecting it in a receiver, subjecting the uncondensed components to further condensation and cooling and collecting the products in a separate receiver, withdrawing the uncondensed gases and vapors from said separate receiver and introducing them into an absorption zone where they may come into intimate contact with condensate from the first mentioned receiver, withdrawing stripped gases from said absorption zone, withdrawing the relatively light condensate collected as described in said separate receiver, subjecting it to reheating and introducing the heated distillate to a stabilizing zone, preferably provided with a reboiling means in or adjacent to the lower portion thereof and with cooling means in or adjacent to the upper portion thereof, supplying gases and vapors eliminated from the distillate in said stabilizing zone to the aforementioned absorption zone, subjecting distillate collected in the lower portion of the stabilizing zone to reboiling, subsequently cooling said stabilized distillate and withdrawing it to storage or elsewhere as desired, subjecting the enriched absorption medium collected in the lower portion of the absorber to heating, if desired, and withdrawing it thru a cooler to storage or elsewhere as desired.

As a feature of the invention a portion of the vapors from the fractionating zone of the cracking system may be separately subjected to condensation and cooling, the products being collected in a separate receiver, distillate from which may be recycled to the upper portion of the fractionating zone to assist fractionation of the vapors, while gases and vapors from said separate receiver may pass to the absorption zone of the system. This arrangement permits utilizing a portion of the unstabilized distillate as a refluxing medium in the fractionator of the system to assist fractionation and to maintain the desired outlet temperature of the vapors from the fractionator instead of utilizing a portion of the stripped and stabilized product for this purpose, thus relieving the stripping and stabilizing equipment of the continuous retreatment of that portion of the product utilized as a refluxing medium to cool and assist fractionation.

The attached diagrammatic drawing illustrates one form of apparatus embodying the principles of the present invention and the following description of the drawing embraces a description of the process of the invention as it may be practiced in conjunction with the operation of a cracking system.

The fractionator is the only portion of the cracking system shown in the drawing as the cracking system may be of any type. The fractionator is indicated at 1 and may comprise a shell containing any suitable fractionating means such as packing, bubble trays, perforated pans or the like. The fractionated vapors may pass from the top of fractionator 1 through line 2 and valve 3 to condenser 4 wherein their relatively heavy components may be condensed, the distillate and uncondensed vapors and gases passing through line 5 and valve 6 to separator 7 from which the distillate may be withdrawn through line 8, valve 9, cooler 10, line 11 and valve 12 to be collected in receiver 13. The relatively light components of the vapors which are not condensed in condenser 4 may pass from separator 7 through line 14 and valve 15 to cooler and condenser 16 where condensation proceeds further. The relatively light condensed distillate and uncondensed vapor and the gas may pass through line 17 and valve 18 to be collected in receiver 19.

A portion of the vapors from fractionator 1 may, if desired, be diverted from line 2 through line 20 and valve 21 to be subjected to condensation and cooling in condenser 22, distillate and gas from which may pass through line 23 and valve 24, to be collected in receiver 25. Distillate collected in receiver 25 may be withdrawn through line 26 and valve 27 and may be recycled by means of pump 28 through line 29 and valve 30 to the upper portion of fractionator 1 to assist fractionation of the vapors and to regulate the outlet temperature of the vapors leaving the fractionator. Uncondensable gas together with liquefiable components may be withdrawn from receiver 25 through line 31 and valve 32 commingling in line 33 with the wet gas withdrawn from receiver 19 through line 34 and valve 35 and passing therewith into absorber 36. Absorber 36 may contain any suitable form of contacting means such as perforated pans, bubble trays or packing and the relatively wet gases introduced into this zone may be countercurrently contacted with the relatively heavy distillate withdrawn from receiver 13 through line 37 and valve 38 and supplied by means of pump 39 through line 40 and valve 41 into the upper portion of absorber 36, passing downward through this zone in direct and countercurrent contact with the ascending gases serving as an absorber oil and substantially freeing said gases of entrained liquefiable components. The relatively dry stabilized gases may pass from absorber 36 through line 42 and valve 43 to a gas holder or elsewhere, as desired. The enriched oil collecting in the lower portion of column 36, comprising relatively heavy distillate together with desirable lighter components absorbed from the gases may be withdrawn through line 47 and valve 48 and may pass through cooler 50, line 51 and valve 52 to storage or to any desired further treatment.

Regulation of the degree of absorption in absorber 36 may be effected in part by heating the enriched product at base of absorber. A closed coil 44 through which steam or any other suitable heating medium may be passed is provided for this purpose in the lower portion of the column. Valves 45 and 46 may control the heating medium passed through coil 44.

The relatively light distillate collected in receiver 19 may contain components of low boiling point and entrained gases which it is desirable to separate from this product. The distillate and entrained gases may be withdrawn from receiver 19 through line 53 and valve 54 to pump 55 from which they may be supplied through line 56, valve 57, heat exchanger 58, line 59 and valve 60 to stabilizing column 61. This column may also be provided with any suitable form of contacting means such as bubble trays, packing or perforated pans. Heating or reboiling means may be provided in the lower portion of column 61 in the form of a closed coil 62 through which steam or any other suitable heating medium may pass in regulated quantities controlled by valves 63 and 64. If desired any other well known type of reboiler, not shown, located either within or outside the main structure of the stabilizing zone may be employed. The vapors and gases may be withdrawn from the upper portion of column 61 through line 65 and may pass through cooler and partial condenser 66 where a portion of the liquefiable components may be condensed passing through line 67 to be collected in separator 68 from which it is returned through line 78 to column 61 to serve as a cooling and fractionating medium in the upper portion of the column. Uncondensed vapors and gases may be withdrawn from separator 68 and may pass through line 69 and valve 70 into column 36 wherein they may be subjected to the same scrubbing action as that afforded the wet gases from receivers 19 and 25 and wherein all or a portion of their liquefiable components may be absorbed, to be withdrawn from the column together with the absorber oil, as already described. Stabilized distillate may be withdrawn from the lower portion of column 61 through line 71 and valve 72, may pass through heat exchanger 58 in indirect contact with the distillate withdrawn from receiver 19, as already described, and may pass through line 73, valve 74, cooler 75, line 76 and valve 77 to storage or to any desired further treatment.

The improved stabilization process of the present invention may be operated in conjunction with any distillation or any conversion system and may be utilized in stabilizing distillate and stripping gases resulting from either high or low pressure fractionation. The materials subjected to stabilization in this system are preferably such that the final stabilized distillate falls within the boiling range of motor fuel, however, this system may be utilized in the treatment of distillates comprising or containing substantial quantities of material boiling above the range of gasoline. Pressures employed in that portion of the system utilized for the condensation, cooling and collection of vapors and gases from the fractionator preferably are substantially the same as those employed in the fractionator and may be relatively high pressures of the order of 100 to 350 pounds per square inch, or may be relatively low pressures ranging from substantially atmospheric to 100 pounds or thereabouts per square inch. The zone in which the wet gases are subjected to absorption preferably utilizes a relatively low pressure which may range from substantially atmospheric to 100 pounds or thereabouts per square inch. The zone in which the distillate is subjected to stabilization may be at substantially the same pressure as the absorber tower or at higher pressures and preferably employs pressures of the order of 60 to 350 pounds per square inch, more or less. Automatic control equipment, not shown, may be used to obtain efficient operating conditions. This equipment would consist of temperature, liquid level, pressure and flow controllers located where necessary or desirable.

As a specific example of the operating conditions which may be employed in the practice of the present invention the cracked vapors are fractionated under a pressure of about 40 pounds per square inch and emerge from the fractionator at a temperature of 350° F. A portion of the vapors sufficient to maintain this outlet temperature are separately condensed, collected and returned to the upper portion of the fractionator, the remaining vapors representing the net make from the process are first subjected to partial condensation at a temperature of about 200° F., the condensed and uncondensed products being thence separated. The condensed products comprising relatively heavy distillate are further cooled and collected and are utilized as absorber oil in the absorption column. The uncondensed products are separately subjected to further cooling and condensation, the relatively light distillate and gas being collected. The wet gas is subjected to absorption in the absorber column under a superatmospheric pressure of about 40 pounds per square inch while the relatively light distillate is subjected to stabilization in the stabilizing column under a superatmospheric pressure of about 100 pounds per square inch. The three receivers of the system are maintained under substantially equalized pressure relative to that employed in the fractionator and the temperature in the receivers is about 75° F. Rich absorber oil leaves the absorption column at a temperature of about 100° F. The stabilized light distillate is withdrawn from the bottom of the stabilizer at a temperature of about 225° F. and the unstabilized light distillate enters this column at a temperature of about 170°

F. The outlet temperature of the vapors and gases from the top of the stabilizer is maintained at about 100° F. This operation may yield a substantially gas free distillate boiling within the range of motor fuel and while the gases from the system may contain small amounts of liquefiable components the system has the advantage of a self-contained unit utilizing a portion of the product from the system as absorber oil.

It is to be understood, of course, that the above example is given merely for purposes of illustration and is not intended to serve as a limitation upon the invention.

We claim as our invention:

1. A method of treating hydrocarbon oil which comprises, passing a portion of the sufficiently converted vapors from the fractionator of a cracking system to a cooling zone and condensing the heavier portions thereof, collecting said condensate and the uncondensed constituents in a separator, further cooling said condensate and passing the same to an absorbing zone, passing the uncondensed constituents from said separator to a separate cooling zone and collecting the resultant condensate and uncondensed components in a receiver, passing the uncondensed components to said absorbing zone, commingling the same with the cooled condensate introduced therein, passing the condensate from said receiver to a stabilizing zone, reboiling said condensate within said zone, cooling and condensing the vaporized portions thereof and introducing to said absorbing zone the components uncondensed by the last-named cooling and condensing.

2. A method of treating hydrocarbon oil which comprises, passing a portion of the sufficiently converted vapors from the fractionator of a cracking system to a cooling zone and condensing the heavier portions thereof, collecting said heavier condensate and the uncondensed constituents in a separator, further cooling said condensate and passing the same to an absorbing zone, passing the uncondensed constituents from said separator to a separate cooling zone and collecting the resultant lighter condensate and uncondensed components in a receiver, passing the uncondensed components to said absorbing zone, commingling the same with the heavier cooled condensate introduced therein, passing the lighter condensate from said receiver to a stabilizing zone, reboiling said lighter condensate within said zone, cooling the vaporized portions thereof, returning the condensed portions to said stabilizing zone, and passing the uncondensed portion from said stabilizing zone to the absorbing zone.

3. A method of treating hydrocarbon oil which comprises, dividing the sufficiently converted vapors from the fractionator of a cracking system into separate portions, passing one of said portions to a cooling zone and condensing the heavier portions thereof, collecting said heavy condensate and the uncondensed constituents in a separator, further cooling said condensate and passing the same to an absorbing zone, passing the uncondensed constituents from said separator to a separate cooling zone and collecting the resultant condensate and uncondensed components in a receiver, passing the uncondensed components to said absorbing zone, commingling the same with the cooled heavy condensate introduced therein, and passing the remaining portion of said sufficiently converted vapors from said fractionator to a separate cooling zone, collecting the resultant condensate and returning the same to said fractionator to assist fractionation.

4. A method of treating hydrocarbon oil which comprises, dividing the sufficiently converted vapors from the fractionator of a cracking system into separate portions, passing one of said portions to a cooling zone and condensing the heavier portions thereof, collecting said condensate and the uncondensed constituents in a separator, further cooling said condensate and passing the same to an absorbing zone, passing the uncondensed constituents from said separator to a separate cooling zone and collecting the resultant condensate and uncondensed components in a receiver, passing the uncondensed components to said absorbing zone, commingling the same with the cooled condensate introduced therein, passing the remaining portion of said sufficiently converted vapors from said fractionator to a separate cooling zone, collecting the resultant condensate in a separate receiver and returning the same to said fractionator to assist fractionation, and passing the uncondensed constituents from said separate receiver in company with the uncondensed components from said first mentioned receiver to said absorbing zone.

5. A process for treating a mixture of hydrocarbon vapors and gases which comprises cooling the mixture to form a relatively heavy condensate, separating the condensate from the uncondensed portion, further cooling the latter to form a lighter condensate and separating this condensate from the still uncondensed portion, scrubbing the latter with said relatively heavy condensate in an absorbing zone, reboiling and fractionating said lighter condensate in a stabilizing zone, and introducing the relatively light vaporous constituents uncondensed in said stabilizing zone into said absorbing zone for scrubbing by the relatively heavy condensate therein.

6. A process for treating a mixture of hydrocarbon vapors and gases which comprises fractionating the mixture in a fractionating zone to condense and separate the heaviest fractions thereof, dividing the fractionated mixture into separate portions, subjecting one of said portions of the fractionated mixture to condensation and returning resultant condensate to the fractionating zone to assist the fractionation therein, separately subjecting the remaining portion of the fractionated mixture to condensation and separating resultant condensate from the uncondensed portion of the mixture, and scrubbing said uncondensed portion with condensate formed by the last mentioned condensation.

7. A process for treating a mixture of hydrocarbon vapors and gases which comprises fractionating the mixture in a fractionating zone to condense and separate the heaviest fractions thereof, dividing the fractionated mixture into separate portions, subjecting one of said portions of the fractionated mixture to condensation and returning resultant condensate to the fractionating zone to assist the fractionation therein, separately cooling the remaining portion of the fractionated mixture thereby forming a second condensate and separating this condensate from the uncondensed components, further cooling the latter to separate additional condensate therefrom, and scrubbing the components uncondensed by the last-named cooling with said second condensate.

8. A process for treating a mixture of hydrocarbon vapors and gases which comprises fractionating the mixture in a fractionating zone to condense and separate the heaviest fractions thereof, subjecting a portion of the fractionated mixture to condensation and returning resultant condensate to the fractionating zone to assist the fractionation therein, separately cooling the remaining portion of the fractionated mixture thereby forming a second condensate and separating this condensate from the uncondensed components, further cooling the latter to separate additional condensate therefrom, and scrubbing the components uncondensed by the last-named cooling with said second condensate in an absorbing zone, reboiling and fractionating said additional condensate in a stabilizing zone, and passing uncondensed constituents from the stabilizing zone into the absorbing zone for scrubbing with said second condensate therein.

9. A process for treating a mixture of hydrocarbon vapors and gases which comprises fractionating the mixture in a fractionating zone to condense and separate the heaviest fractions thereof, dividing the fractionated mixture into separate portions, subjecting one of said portions of the fractionated mixture to condensation and separating the condensed constituents from the uncondensed constituents, returning such condensed constituents to the fractionating zone to assist the fractionation therein, separately subjecting the remaining portion of the fractionated mixture to condensation and separating resultant condensate from the uncondensed portion of the mixture, passing said uncondensed portion and said uncondensed constituents to an absorbing zone and scrubbing the same therein with condensate formed by the last mentioned condensation.

10. The process as defined in claim 7 further characterized in that the constituents of the first-mentioned portion of the fractionated mixture which are not condensed by said condensation are also scrubbed with said second condensate.

PERCY MATHER.
DONALD J. BERGMAN.